Figure 1:
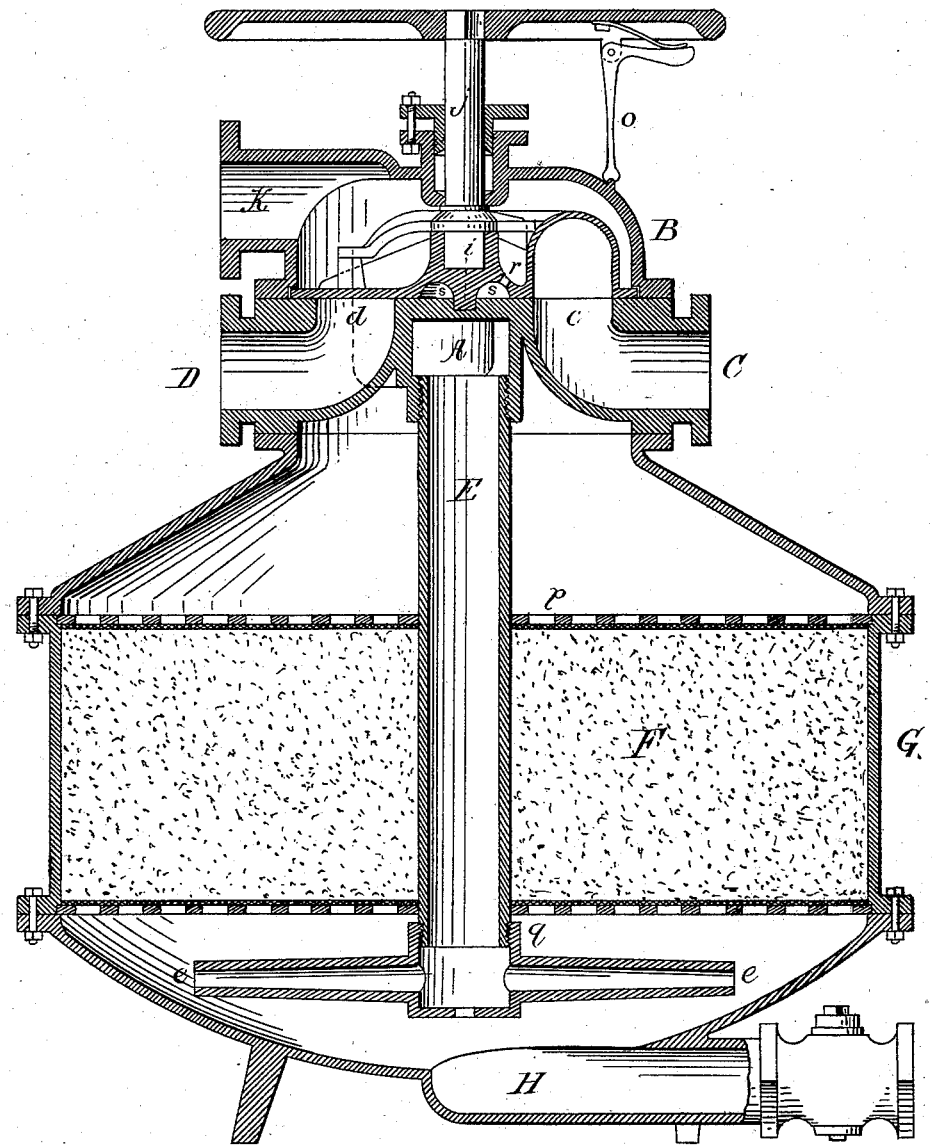

(Model.)

3 Sheets—Sheet 1.

E. K. HAYNES.
FILTER.

No. 282,313. Patented July 31, 1883.

WITNESSES

INVENTOR (Model.)

E. K. HAYNES.
FILTER.

No. 282,313. 3 Sheets—Sheet 2. Patented July 31, 1883.

WITNESSES
W. C. Fogg
Fred. Haines

INVENTOR
Edgar K. Haynes
by his attys
Clarke & Raymond (Model.) 3 Sheets—Sheet 3.
E. K. HAYNES.
FILTER.
No. 282,313. Patented July 31, 1883.
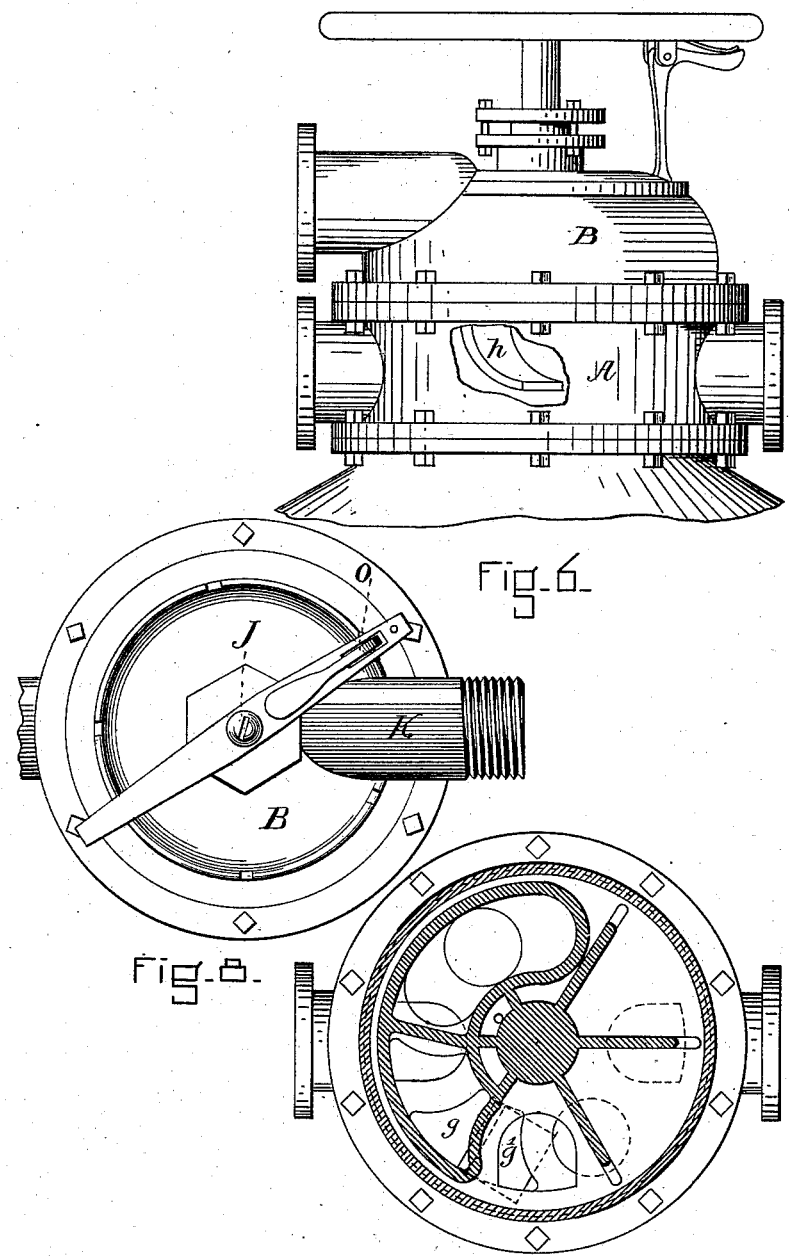
WITNESSES
INVENTOR

UNITED STATES PATENT OFFICE.

EDGAR K. HAYNES, OF BOSTON, MASSACHUSETTS, ASSIGNOR TO THE BOSTON WATER PURIFIER COMPANY, OF MAINE.

FILTER.

SPECIFICATION forming part of Letters Patent No. 282,313, dated July 31, 1883.

Application filed March 13, 1882. (Model.)

*To all whom it may concern:*

Be it known that I, EDGAR K. HAYNES, of Boston, in the county of Suffolk and State of Massachusetts, a citizen of the United States, have invented a certain new and useful Improvement in Filters, of which the following specification, with reference to the accompanying drawings, is sufficient to enable one skilled in the art to make and use the invention.

The filter, which is introduced into a water-conduit with the intention of having the water percolate through the filter from one branch of the conduit and be delivered from the filter to the other branch of the conduit, requires some essential things in its construction. There must be means for diverting the water from the conduit, so as to run through the filtering material, and afterward return into the delivery branch of the conduit, and either the current or the filtering material must be reversed from time to time, so as to cleanse the same; and it is also desirable to have a communication from the filter to a waste-pipe, in order that the impurities of the water which has passed through the filter shall not be carried into the supply-pipe; and in the better form of filters it is arranged not only that the stream or filter should be once reversed, but that it should be twice reversed in order that what is caught from the water in the first rinsing may be rinsed out in the second rinsing by a reverse current and turned into the waste-pipe. In the reversal of a filter the work of turning the filtering material over, so as to present the opposite side of it to the current of water, is very simple and easy in a small filter, but becomes more or less laborious when the filter is large. Consequently, for filters of comparatively large size, it has been considered preferable to reverse the stream rather than to reverse the filter itself. This reversal of the stream has been hitherto managed by employing a two or three way plug-cock, and this method is mechanical and practical for filters of limited size; but when the water-ways in the plug are necessarily comparatively large, the amount of metal in the parts of the plug surrounding the water-ways requires to be largely increased. In case the water-way is largely increased in size, the plug-cock therefor is still an instrument of limited capacity; yet the management of a filter by reversal of the current of water instead of by reversal of the filtering material is a desirable method of construction. I have devised for the purpose of performing this work in large filters a water-gate; and in order that the water may be passed through the filter in such a way as to cleanse it more perfectly than it otherwise would be, I have also devised a method of distribution of the water, so that it shall rise uniformly through the filtering material.

Figure 2:
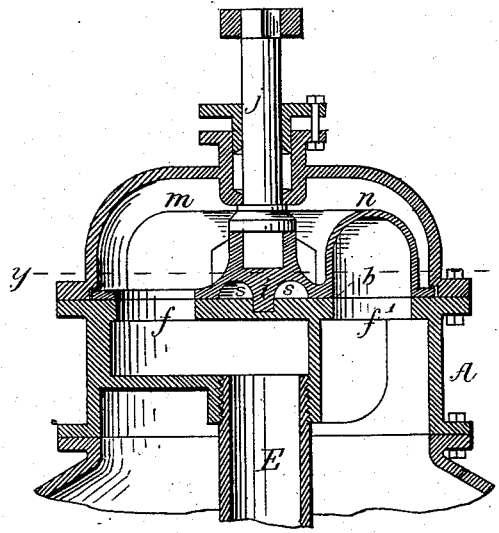
Figure 3:
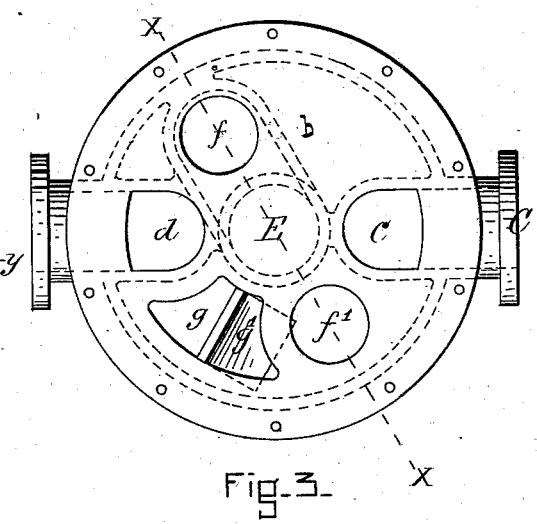
Figure 4:
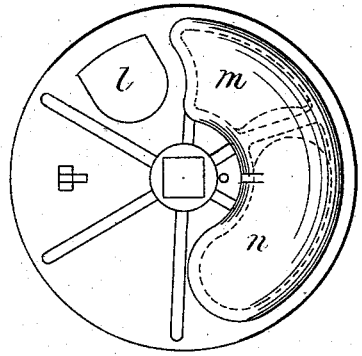
Figure 5:
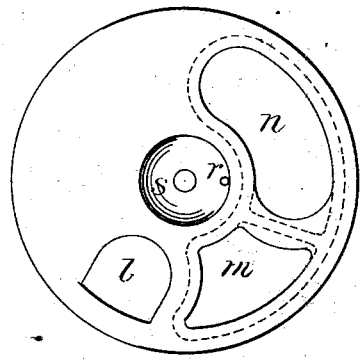

In the drawings, Figure 1 is a vertical section of the filter, its gate, and attachments. Fig. 2 is a vertical section of the gate and induction-pipe upon the line $x'x$ of Fig. 3. Fig. 3 is a plan of the seat of the gate. Fig. 4 is a top plan of the gate. Fig. 5 is a bottom plan of the gate. Fig. 6 is an elevation of the case of the gate, with one side broken out to show a contained deflector. Fig. 7 is a horizontal section on the line $y\,y$ of Fig. 2. Fig. 8 is a plan view of the filter.

I prefer to make the case of the gate of this filter in two parts, to be bolted together through flanges at or about the line of the valve-seat.

A is the lower part of the case having flanges for the attachment of the upper part of the case or dome B. The plane seat $b$ of the plan shown in Fig. 3 surmounts and forms the upper surface of the part A, pipes C leading to the place to be supplied with water, and D, leading to the waste or common sewer, penetrate the casing A, and are turned up, so as to pass through the seat $b$. This gate is attached to the body of the filter G, which contains the filtering material F between two perforated diaphragms, $p\,q$. A water-pipe, E, descends from the water-gate, through the filter, to the bottom of its case, and has distributing-pipes $e$ at its lower portion, beneath the lower diaphragm, $q$, which incloses the filtering material F, and these distributing-pipes carry the water toward the sides of the filtering-chamber G.

The pipe H, controlled by a valve, may be inserted in the bottom of the filtering-chamber G, if desired.

The seat $b$ is perforated with holes, as shown in Fig. 3; one, $d$, leading to the waste-pipe D;

another, c, leading to the supply-pipe, and two holes, f f', at opposite sides of the seat, leading through the seat. One of these holes, f, communicates with a passage leading to the central pipe, E, that descends to the bottom of the filter, and the other, f', leads into the cavity of the filtering-chamber G. Still another hole, g g', irregularly shaped, is made in the valve-seat, which also communicates with the filtering-chamber, and a deflector, (shown in Fig. 6,) h, extends from it into the cavity of the filtering-chamber and divides the hole transversely into the said parts g and g'. This deflector is shown in dotted lines in Fig. 3.

A horizontal gate pivoted at the center at i, and controlled by a valve-stem, j, which ascends through a stuffing-box at the summit of the cover B, rests upon the seat b, and may be rotated upon it. Through the cover B extends the inlet-passage k, which delivers water from the source of supply upon the top of the gate. The gate is ribbed for the purpose of strength, as shown in the top plan, Fig. 4, and it has made through it one hole, l, which may be brought in direct communication with either of the holes in the seat already before referred to, and thereby water may be admitted through the gate into either supply or waste pipe, or into the passage f, leading to the central tube, E, or into the orifices f' g, leading into the filtering-chamber.

Holes are made through the gate, which are covered by domes, as shown at m and n, the dome at m having with the same radial width about half the circumferential length, measuring upon a plan of the gate of that of the dome n. An index attached to a hand-wheel on the valve-stem j indicates the position to be assumed by the gate in order to connect the water-channels, so as to work as desired. The gate being now turned so that the orifice l coincides with the orifice f in the valve-seat, water entering from the inlet-pipe will descend through the central tube, E, and be distributed under the filtering material, and rise through it to the top of the filtering-chamber. This position of the gate will bring the dome n to coincide with the orifice f' in the seat, and also the orifice c in the seat, and so a communication will be made from the cavity of the filtering-chamber beneath the dome n into the pipe leading to the place to be supplied and filtered water will flow through said pipe. When the filter has become foul and it is desired to rinse it, the orifice l in the gate is brought to coincide with the orifice f in the seat, and thereby water will be admitted upon the top of the filtering material, and will be forced through it, rinsing it and cleansing it until it reaches the bottom, when it will pass through the distributing-pipes up through the central tube, E, and through the orifice f and the dome n, which will then be over the orifice f, and through the dome n and the orifice d in the seat into the waste-pipe D. This will substantially clean the filter of the impurities of the water collected by it before the gate was reversed; but there will still remain in the filter some impurities derived from the water which has just been used in cleansing it, and these are to be rinsed out by water run through the other way without going into the pipe leading to the place of consumption. The dome m shall connect the hole g and the waste-pipe D, and water admitted into the filter will then rinse the impurities from the last washing from its filtering material and carry it off through the waste-pipe D. This water will enter by holes g f', and be run over the surface of the filter by aid of deflector h.

The hand-wheel on the valve-stem j has an automatic catch, o, which engages with notches, pins, or stops on the dome B, properly arranged to indicate the position of the gate, and marked so as to show whether the water is passing through the filter to the place to be supplied, or is cleansing it and passing into the waste, or making the second cleansing, or going, as is possible, to the house without filtering.

When the filter is exceedingly foul, the valve in pipe H is opened, and a very thorough cleansing is had.

Near the central pivot, i, is a hole, r, communicating with a recess, serving to partly balance the water-pressure on top of the gate.

I claim as my invention and desire to secure by Letters Patent of the United States—

1. In a water-gate, the valve-plate provided with hole r, and the seat-plate b, and recess s, combined and adapted to balance the water-pressure, substantially as and for the purposes specified.

2. In combination with a water-filter having inlet, delivery, and waste-pipes organized therewith, the horizontal rotating gate and its seat, in combination with each other, constructed, arranged, and adapted to operate substantially as and for the purposes described.

3. In combination with the seat of a water-gate having holes f f' therein, the central tube, E, and dome n, substantially as and for the purposes described.

4. In combination with the seat b, having orifices f, f', c, d, and g therein, the horizontal rotating gate with its perforation l and dome n, substantially as and for the purposes described.

5. In combination with the orifices g g' in the seat b, the deflector h, for the purpose of deflecting the water, substantially as described.

6. In combination with the central tube, E, the fixed distributing-tube e, beneath the lower perforated diaphragm of the filter, substantially as and for the purposes described.

7. In combination with the hand-wheel and valve-stem of a rotating gate, the automatic catch o, serving also as an indicator of the position, substantially as described.

EDGAR K. HAYNES.

Witnesses:
 THOS. WM. CLARKE,
 GEO. H. GOODWIN.